(12) United States Patent
Shizuya et al.

(10) Patent No.: US 7,543,310 B2
(45) Date of Patent: Jun. 2, 2009

(54) OPTICAL DISK APPARATUS WITH OPENINGS FOR DISCHARGING AIR FROM THEREIN

(75) Inventors: Mitsukata Shizuya, Ryugasaki (JP); Makoto Ibe, Hitachinaka (JP); Hideyuki Onuma, Urayasu (JP); Shinya Tsubota, Mito (JP); Yoshiaki Yamauchi, Minori (JP); Keiji Sasao, Kasumigaura (JP); Manabu Ochi, Fujisawa (JP); Hiroyuki Toyoda, Hitachinaka (JP)

(73) Assignee: Hitachi - LG Data Storage, Inc. (JP)

( * ) Notice: Subject to any disclaimer, the term of this patent is extended or adjusted under 35 U.S.C. 154(b) by 338 days.

(21) Appl. No.: 11/193,712

(22) Filed: Jul. 29, 2005

(65) Prior Publication Data
US 2006/0184951 A1   Aug. 17, 2006

(30) Foreign Application Priority Data
Feb. 15, 2005   (JP)   ............................. 2005-037040

(51) Int. Cl.
*G11B 17/04* (2006.01)
(52) U.S. Cl. ....................................... 720/601; 720/655
(58) Field of Classification Search ................. 720/601, 720/655
See application file for complete search history.

(56) References Cited

U.S. PATENT DOCUMENTS

D270,443 S  *  9/1983 Nagatomo ................. D14/156
5,265,072 A  * 11/1993 Numata et al. ............. 720/649
6,238,467 B1 *  5/2001 Azarian et al. ............. 96/135
2002/0039340 A1 *  4/2002 Minase ..................... 369/75.1
2005/0086675 A1 *  4/2005 Lee et al. .................. 720/648
2005/0097580 A1 *  5/2005 Lee .......................... 720/600
2005/0108737 A1 *  5/2005 Chang ...................... 720/601
2005/0169120 A1 *  8/2005 Toyoda et al. ............. 369/30.27
2005/0193404 A1 *  9/2005 Omori et al. ............... 720/648
2005/0198654 A1 *  9/2005 Muta et al. ................ 720/601

FOREIGN PATENT DOCUMENTS

| JP | 2000048440 A * | 2/2000 |
| JP | 2000-231783 | 8/2000 |
| JP | 2001-155479 | 6/2001 |
| JP | 2002-109856 | 4/2002 |
| JP | 2003-151259 | 5/2003 |
| JP | 2004-241024 | 8/2004 |

OTHER PUBLICATIONS

U.S. Appl. No. 11/021,986, filed Dec. 21, 2004, Toyoda, et al.

* cited by examiner

*Primary Examiner*—Brian E Miller
*Assistant Examiner*—Adam B Dravininkas
(74) *Attorney, Agent, or Firm*—Townsend and Townsend and Crew LLP

(57) ABSTRACT

In an optical disk apparatus for recording and/or reading information with respect to an optical disk, comprising, a chassis for containing the optical disk, and a tray being movable with respect to the chassis and adapted to support the optical disk thereon so that the optical disk is movable with respect to the chassis, the chassis has an opening for discharging an air from an inside of the chassis to an outside of the chassis through the opening.

13 Claims, 10 Drawing Sheets

FRONT (FRONT SURFACE) ↔ REAR (BACK SURFACE)

FRONT (FRONT SURFACE) ↔ REAR (BACK SURFACE)

FRONT (FRONT SURFACE) ↔ REAR (BACK SURFACE)
LEFT (LEFT SIDE SURFACE)
RIGHT (RIGHT SIDE SURFACE)

OPTICAL DISK APPARATUS WITH OPENINGS FOR DISCHARGING AIR FROM THEREIN

INCORPORATION BY REFERENCE

The present application claims priority from Japanese application JP2005-37040 filed on Feb. 15, 2005, the content of which is hereby incorporated by reference into this application.

BACKGROUND OF THE INVENTION

The present invention relates to an optical disk apparatus for writing and/or reading information on an optical disk.

JP-2001-155479-A, JP-2003-151259-A and JP-2004-241024-A disclose an air discharging opening arranged at a side wall of chassis opposite to an outer periphery of an optical disk in a direction perpendicular to a thickness direction of the optical disk.

JP-2004-241024-A, JP-2000-231783-A and JP-2002-109856-A disclose an air intake opening arranged at a top wall of chassis facing to a reverse surface of an optical disk opposite to a front surface thereof which through which an information is transmitted between the optical disk and an optical pickup.

BRIEF SUMMARY OF THE INVENTION

An object of the present invention is to provide an optical disk apparatus for writing and/or reading information on an optical disk, out of which apparatus an air can be discharged effectively.

According to the invention, in an optical disk apparatus for recording information into an optical disk through a front surface of the optical recording disk and/or reading the information from the optical disk through the front surface, comprising, a chassis including a first wall extending to be opposite to the front surface in a thickness direction of the optical disk while being prevented from being opposite to the front surface through the optical disk in the thickness direction, and a second wall extending to be opposite to the front surface through the optical disk in the thickness direction, so that the optical disk is capable of being contained in the chassis, and a tray being movable with respect to the chassis in a movable direction perpendicular to the thickness direction and adapted to support the optical disk thereon so that the optical disk is movable with respect to the chassis in the movable direction, the chassis (or at least one of the first and second walls) has an opening for discharging an air from an inside of the chassis to an outside of the chassis through the opening.

If the second wall has the opening for discharging the air from the inside of the chassis to the outside of the chassis through the opening, a centrifugal force caused by the rotation of the optical disk can generate effectively a radially outward flow of the air along the front surface taken from a radial inside of the optical disk along a spindle for rotating the optical disk to effectively draw the air heated by an optical pickup and a spindle motor from the radial inside of the optical disk to the outer periphery of the optical disk so that an air pressure around an outer periphery of the optical disk (facing to the second wall in the thickness direction) can be kept higher than the air pressure at a radially inner area of the optical disk (or lower than the air pressure at a radially inner area of the front surface prevented from facing to the second wall in the thickness direction).

If the opening is arranged on the at least one of the first and second walls in such a manner that as seen in a direction parallel to the thickness direction, the opening is capable of being arranged at a radial outside with respect to an outer periphery of the optical disk to prevent the optical disk and the opening from overlapping each other when the tray is positioned at a disk rotating position at which the optical disk is capable of being rotated for recording the information into the optical disk and/or reading the information from the optical disk, the gaseous pressure around the outer periphery of the optical disk can be kept lower than the gaseous pressure at the radially inner area of the front surface so that the centrifugal force caused by the rotation of the optical disk can generate effectively the radially outward flow of the air along the front surface taken from the radial inside of the optical disk along the spindle for rotating the optical disk to effectively draw the air heated by the optical pickup and the spindle motor from the radial inside of the optical disk to the outer periphery of the optical disk.

If the opening extends through the at least one of the first and second walls in a direction parallel to the thickness direction to allow the air to flow in the direction parallel to the thickness direction through the opening, the air flow discharged out of the chassis can flow distantly away from an intake air taken into the chassis or another opening of the chassis for taking in the air from the outside of the chassis into the inside of the chassis.

If the chassis has an aperture through which the tray is movable in the movable direction so that a part of the tray capable of holding thereon at least a part of the optical disk is capable of being taken out through the aperture to an outside of the chassis, the tray is movable to a disk rotating position at which the optical disk is capable of being rotated in a predetermined (or fixed) rotary direction on a rotational axis as seen in the thickness direction for recording the information into the optical disk and/or reading the information from the optical disk, and the opening is arranged on a part of the chassis (or the at least one of the first and second walls), which part is defined, when the tray is kept at the disk rotating position so that the optical disk is rotated on the rotational axis in the predetermined rotary direction for recording the information into the optical disk and/or reading the information from the optical disk, as seen in the thickness direction, by a first imaginary straight line extending from the rotational axis toward the aperture in a direction parallel to the movable direction and a second imaginary straight line extending from the rotational axis in a direction perpendicular to the movable direction, while at a boundary of the part along the second imaginary straight line, a tangential component of a moving direction of (preferably an outer periphery) of the optical disk proceeds (or extends or is directed) toward the aperture (and is prevented from proceeding, extending or being directed away from the aperture) as seen in the thickness direction, the air is urged by the rotation of the optical disk along the tangential component of the moving direction of the optical disk proceeding toward the aperture as seen in the thickness direction and is discharged out of the chassis in a position relatively close to the aperture as seen in the thickness direction, the air can be effectively discharged out of a recess of a computer when the optical disk apparatus is received by the recess with the aperture prevented from being covered by the recess.

If the opening is arranged on the at least one of the first and second walls in such a manner that as seen in a direction parallel to the thickness direction, the opening is capable of being arranged at an outside with respect to the tray to prevent the tray and the opening from overlapping each other when the tray is positioned at a disk rotating position at which the optical disk is capable of being rotated for recording the information into the optical disk and/or reading the information from the optical disk, the air flow at the opening in the direction parallel to the thickness direction is restrained from being obstructed by the tray so that the air heated by the optical pickup and the spindle motor can be flow in the direction parallel to the thickness direction with restricted flow resistance.

If the opening is arranged on the chassis (or the at least one of the first and second walls) in such a manner that as seen in a direction parallel to the thickness direction, the opening is capable of being overlapping a region in the chassis, at which region a maximum pressure of the air in the chassis is generated (by the optical disk) when the tray is kept at a disk rotating position at which the optical disk is capable of being rotated for recording the information into the optical disk and/or reading the information from the optical disk(, and the opening is prevented from flowing the air through the opening), the air can be discharged effectively out of the chassis, the air can be effectively discharged through the openings.

If the chassis has an aperture through which the tray is movable in the movable direction so that a part of the tray capable of holding thereon at least a part of the optical disk is capable of being taken out through the aperture to an outside of the chassis, the tray is movable to a disk rotating position at which the optical disk is capable of being rotated in a predetermined (or fixed) rotary direction on a rotational axis as seen in the thickness direction for recording the information into the optical disk and/or reading the information from the optical disk, and the opening is arranged on a part of the chassis (or the at least one of the first and second walls), which part is defined, when the tray is kept at the disk rotating position so that the optical disk is rotated on the rotational axis in the predetermined rotary direction for recording the information into the optical disk and/or reading the information from the optical disk, as seen in the thickness direction, by a first imaginary straight line extending from the rotational axis in a direction away from the aperture and parallel to the movable direction and a second imaginary straight line extending from the rotational axis in a direction perpendicular to the movable direction, while at a boundary of the part along the second imaginary straight line, a tangential component of a moving direction of (preferably an outer periphery) of the optical disk proceeds (or extends or is directed) away from the aperture (and is prevented from proceeding, extending or being directed toward the aperture) as seen in the thickness direction, the air is urged to a terminating end of the inside of the chassis opposite to the aperture in the movable direction so that the region at which the maximum pressure of the air in the chassis is generated (when the opening is prevented from flowing the air through the opening) is formed at the terminating end of the inside of the chassis, and the opening is formed at the region to effectively discharge the air out of the chassis.

If the opening (formed on at least one of the first and second walls) has first and second peripheral edges opposite to each other in a direction of an air flow capable of being generated (in the chassis) by a rotation of the optical disk (in a predetermined or fixed rotational direction), the first peripheral edge is arranged at a relatively downstream side with respect to the second peripheral edge in the direction of the air flow, and a distance of the first peripheral edge obtainable with respect to the optical disk in the thickness direction is smaller than a distance of the second peripheral edge obtainable with respect to the optical disk in the thickness direction (when the tray is positioned at a disk rotating position at which the optical disk is capable of being rotated in a predetermined (or fixed) rotary direction on a rotational axis as seen in the thickness direction for recording the information into the optical disk and/or reading the information from the optical disk), the first peripheral edge can guide the air flow into the opening to be effectively discharged through the opening.

If the opening (formed on at least one of the first and second walls) has first and second peripheral edges opposite to each other in a direction of an air flow capable of being generated (in the chassis) by a rotation of the optical disk on a rotational axis (in a predetermined or fixed rotational direction), the first peripheral edge is arranged at a relatively downstream side with respect to the second peripheral edge in the direction of the air flow, and as seen in a direction parallel to the thickness direction, a distance of the first peripheral edge obtainable with respect to the rotational axis in a direction perpendicular to a movable direction in which the tray is movable with respect to the chassis is smaller than a distance of the second peripheral edge obtainable with respect to the rotational axis in the direction perpendicular to the movable direction (when the tray is positioned at a disk rotating position at which the optical disk is capable of being rotated in a predetermined (or fixed) rotary direction on the rotational axis as seen in the thickness direction for recording the information into the optical disk and/or reading the information from the optical disk), the first peripheral edge can guide the air flow into the opening to be effectively discharged through the opening.

If the at least one of the first and second walls has an extension part overlapping at least partially the opening as seen in a direction parallel to the thickness direction and capable of being arranged between the opening and the optical disk in the thickness direction, the first peripheral edge can guide the air flow into the opening to be effectively discharged through the opening.

If the tray has first and second surface areas which are adjacent to each other in a direction of an air flow capable of being generated (in the chassis) by a rotation of the optical disk, are prevented from facing to the optical disk in the thickness direction and faces to the least one of the first and second walls in the thickness direction, the first surface area is arranged at a relatively downstream side with respect to the second surface area in the direction of the air flow, a distance between the first surface area and the least one of the first and second walls in the thickness direction is greater than a distance between the second surface area and the least one of the first and second walls in the thickness direction, and the opening and the first surface area face to each other in a direction parallel to the thickness direction (while being prevented from facing to each other in the direction parallel to the thickness direction through the tray), the gaseous pressure over the first surface area is increased to effectively discharge the air through the opening.

If the opening is arrange on the at least one of the first and second walls in such a manner that the opening is prevented from extending to overlap a rotational axis of the optical disk as seen in a direction parallel to the thickness direction when the tray is positioned at a disk rotating position at which the optical disk is capable of being rotated on the rotational axis for recording the information into the optical disk and/or reading the information from the optical disk, the air is prevented from being taken into the inside of the chassis through the opening.

It is preferable for moving the air from the optical pickup and or the spindle motor that the chassis has an intake opening extending between the tray and the first wall in the thickness direction so that the air is taken into the inside of the chassis through the intake opening.

It is preferable for preventing a contaminant from proceeding into the inside of the chassis that the tray has a filter contatactable with the first wall to cover a clearance capable of being formed between the tray and the first wall when the tray is positioned at a disk rotating position at which the optical disk is capable of being rotated for recording the information into the optical disk and/or reading the information from the optical disk (so that an air passing through the clearance is filtered when the tray is positioned at the disk rotating position). If the tray has a sealing member for rectifying a radially outward air flow capable of being urged by a rotation (or centrifugal force) of the optical disk so that the radially outward air flow is prevented from being mixed with the filtered air, a temperature of the air taken into the inside of the chassis is restrained from being increased.

If the tray includes a unit having a spindle motor for rotating the optical disk, an optical pickup movable with respect to the spindle motor to record the information into the optical disk through the optical pickup and/or read the information from the optical disk through the optical pickup, and a heat radiation coating applied onto an area of a surface of the unit, the area and at least one of the spindle motor and a movable range in which the optical pickup is movable as seen in a direction parallel to the thickness direction overlap each other as seen in the direction parallel to the thickness direction, and a heat radiation coefficient of the heat radiation coating is greater than that of the unit and the like, at least one of the spindle motor and the optical pickup is effectively cooled.

Other objects, features and advantages of the invention will become apparent from the following description of the embodiments of the invention taken in conjunction with the accompanying drawings.

DETAILED DESCRIPTION OF THE INVENTION

Hereafter, embodiments of the invention will be explained with using the drawings.

Embodiment 1

Figure 1:
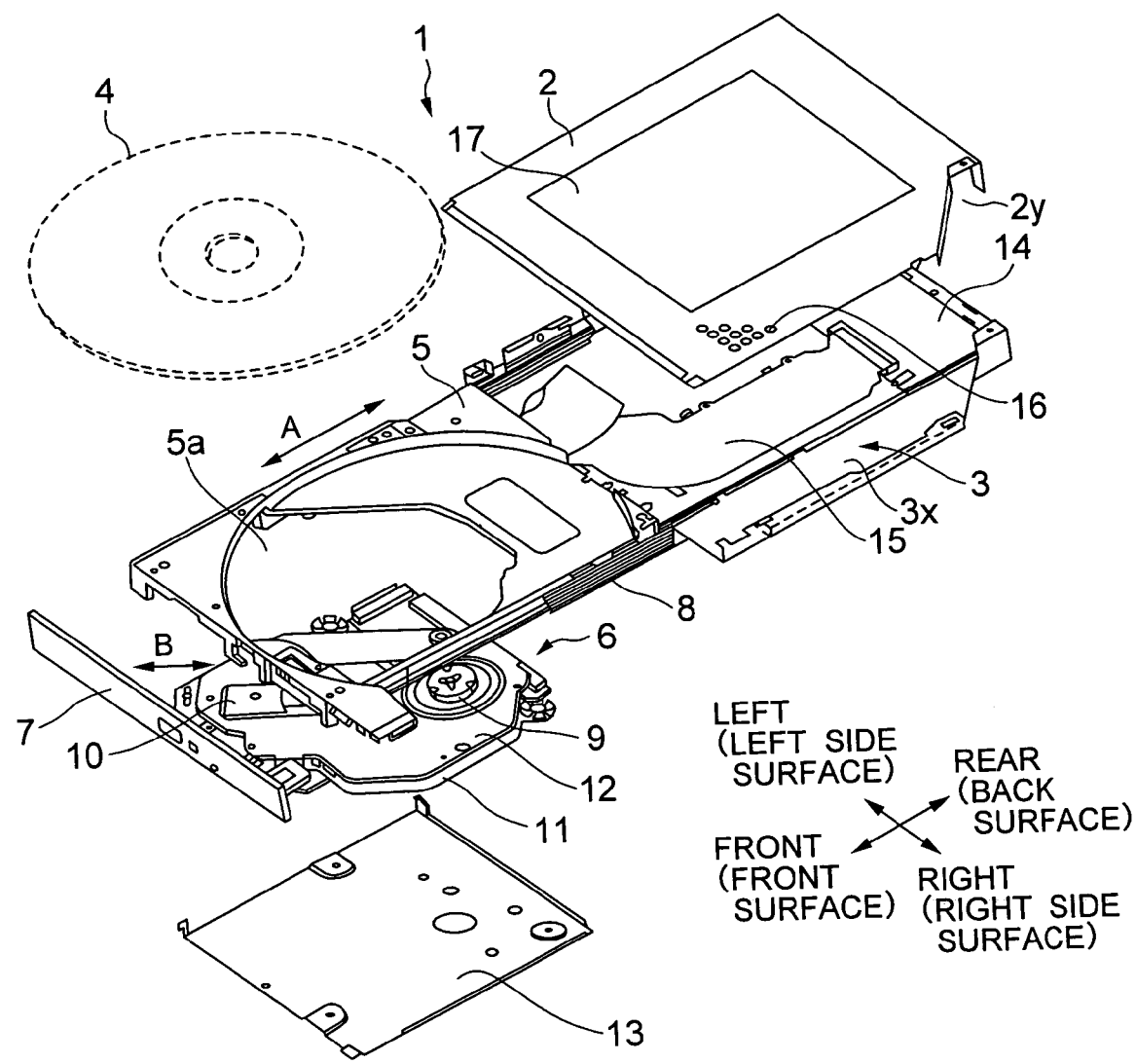
FIG. 1 is an oblique projection exploded view showing an embodiment of optical disk apparatus of the invention.
Figure 2:
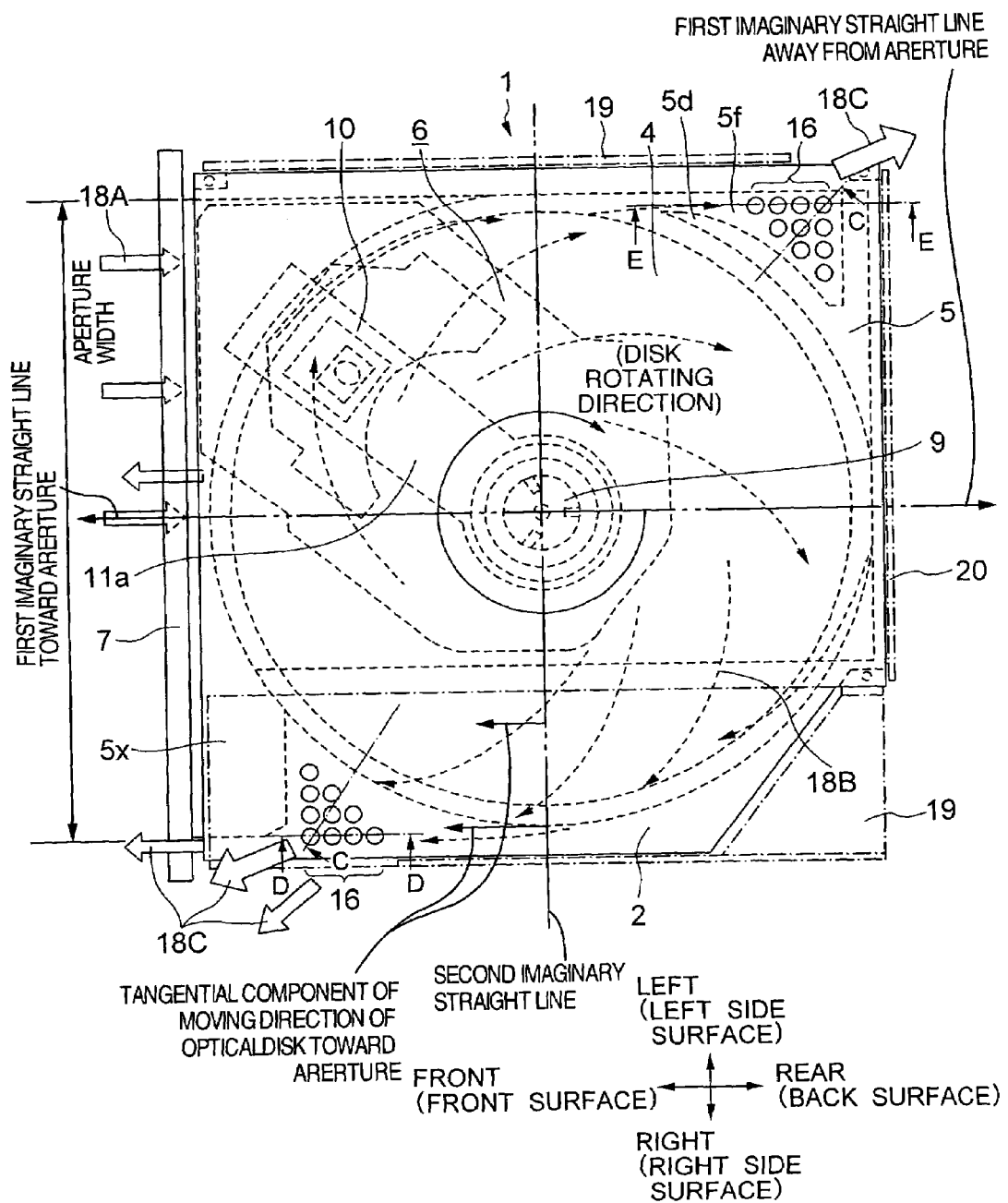
FIG. 2 is a plane view of the optical disk apparatus shown in FIG. 1.
Figure 3A:
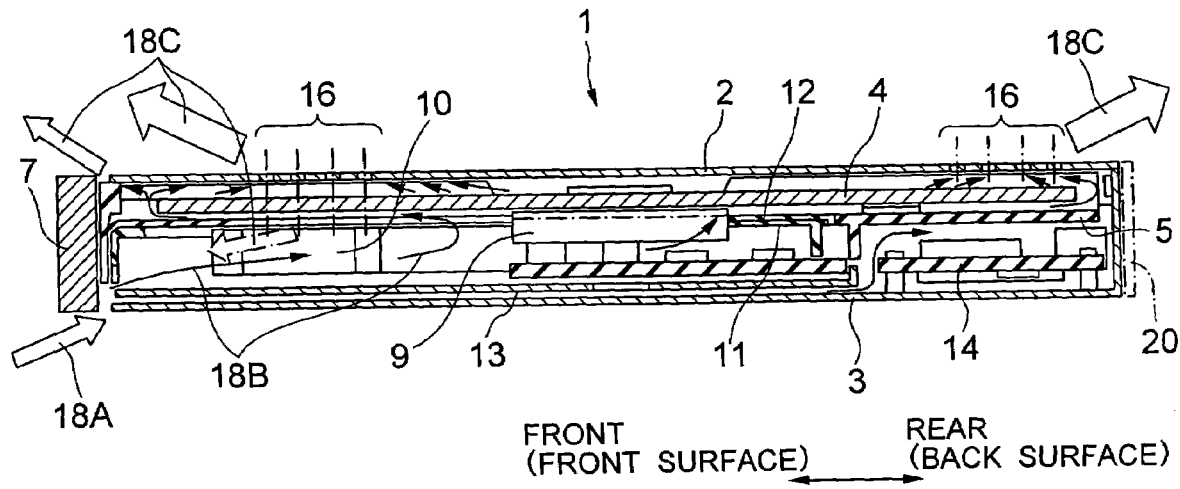
FIGS. 3A-C are a cross sectional view taken along C-C in FIG. 2, a cross sectional view taken along D-D in FIG. 2 and a cross sectional view taken along E-E in FIG. 2, respectively.
Figure 3B:
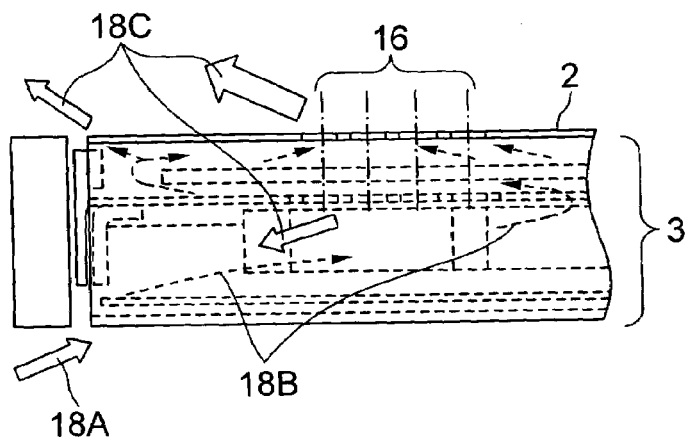
Figure 3C:
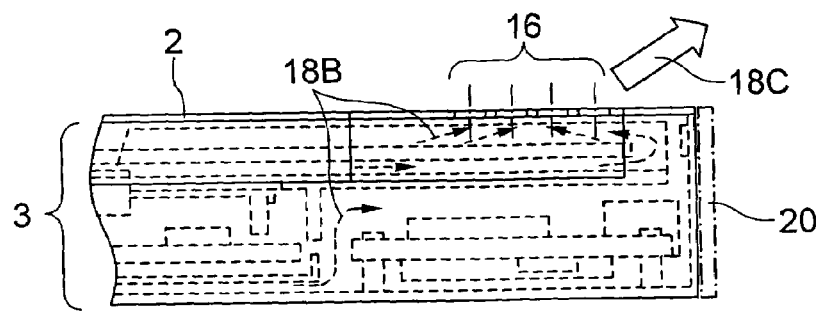

FIG. 1 is an exploded oblique projection view of an embodiment of optical disk apparatus of the invention. FIG. 2 is an upper view of the optical disk apparatus shown in FIG. 1, FIG. 3A is a cross sectional view along C-C of FIG. 2, FIG. 3B is a cross sectional view along D-D in the vicinity of a front discharge opening, and FIG. 3C is a cross sectional view along E-E in the vicinity of a rear discharge opening. In this embodiment, a thin type optical disk apparatus to be mounted on a note type personal computer or the like is mainly explained. In an optical disk apparatus 1, a tray 5 on which an optical disk is to be mounted is contained between a top case 2 and a bottom case 3 in a movable manner in A direction along guide rails 8.

The top case has a chamfered portion 2y which is formed by chamfering a corner of a rectangular shape, and a bent portion at a rear terminating end. The bottom case 3 has a height portion 3x as a portion for cooperating with the tray to mount the optical disk thereon and a portion surrounding it, and the substantially same upper shape as that of the top case. Therefore, a combination of the top case 2 and bottom case 3 form a container shape as a chassis or casing. The tray 5 has a recess at a central portion thereof so that the disk is mounted on the recess. Further, the tray 5 has at a front portion thereof a chamfered portion 5a for mounting a unit mechanism or mechanical unit as described below.

A front panel 7 is attached to a front surface of the tray 5, and the unit mechanism 6 including a spindle motor 9 for rotating the disk 4 and an optical pickup 10 including a laser driving integrated circuit for generating a laser beam to read and write an information from and into the disk 4 is fixed to the front panel as a part of the tray 5. The unit mechanism 6, tray 5 and front panel 7 fixed to each other form a unit.

On the unit mechanism 6, the spindle motor 9 is mounted on a mechanical chassis 11 whose upper and lower surfaces are covered by a unit cover 12 and an under-cover 13. A center of the spindle motor 9 is aligned with a center of the disk 4. The optical pickup 10 is mounted on the mechanical chassis 11 in a movable manner in a radial direction of the disk 4. Therefore, the mechanical chassis 11 has at a front left portion or area a rectangular notch or slit portion 11a. A circuit substrate 14 is arranged at a rear lower portion of the chassis. The circuit substrate 14 and the unit mechanism 6 are connected to each other through a flexible printed wiring plate 15 to transmit control information and signal processing information.

A fixing member 19 for being mounted on the personal computer is attached to left and right side surfaces of the optical disk apparatus 1. A connector part 20 for being connected to an internal wiring of the personal computer is attached to or arranged at a rear surface of the optical disk apparatus. In FIG. 1, since the unit mechanism 6 is arranged at a left side from the center of the optical disk apparatus, a height or depth of this area of the chassis is great. On the other hand, the bottom cover 3 has a height portion 3x at a right side thereof to face to a lower surface of the optical disk 4. The optical pickup 10 is movable between the center of the chassis or optical disk apparatus and a front left area of the unit mechanism 6.

In this embodiment, a plurality of intake openings for taking in an external air to cool an interior of the optical disk apparatus and a plurality of discharge openings 16 for discharging the interior air are formed. Concretely speaking, the intake openings are formed as a clearance between the front panel 7 and the bottom case 3 at a front low area of the front surface of the chassis at an inside from the front panel. Further, the ten discharge openings 16 are formed at a front right corner area of a height portion 3x of the bottom case 3 and the top case 2 and at a rear left corner area. The position of the discharge openings at the front right corner area is arranged at an outside of a label 17 adhered to the upper surface or top case 2 of the chassis and a radial outside of an outer periphery of the disk mounted on the apparatus. An interior air 18B swirls in accordance with a clockwise rotation of the optical disk 4. A member 5x for blocking the swirl flow is arranged at a right corner of a front end of the tray 5. The discharge opening 16 are arranged at an upstream side from the member 5x.

In the chassis, the interior air 18B is blocked or dammed at the radially outer area of the outer periphery of the disk to be pressurized. When being equipped in the personal computer, a clearance is formed between the top case 2 of the optical disk apparatus 1 and a surrounding surface in the personal computer adjacent to each other. Further, a right side of the bottom case 3 has a height portion 3x and an equipping member is fixed under this side. At this member covers partially the under surface of this height portion, a clearance is formed between this portion of the bottom case 3 and the surrounding surface. Therefore, an internal air 18c can be securely discharged from the discharge openings 16 at the front right corner area of the upper surface of the top case 2 and the bottom case 2 to effectively discharge the air 18C. A flow rate of the air taken in from the exterior is effectively increased to decrease temperatures of the interior air and inner parts. Therefore, a heat radiation or cooling performance of the chassis is significantly improved.

For forming the discharge openings 16 at the rear left corner area, a partition wall 5d and a diverging flow path 5f are formed to guide a flow of the interior air 18B at this corner area as the dead space along a concentric circle with the disk, and a diverging flow path 5f is formed to introduce the interior air to the discharge openings 16. At these discharge openings 16, since the interior air 18B is blocked or dammed at the radial outside of the outer periphery of the disk, the interior air of the optical disk apparatus is further pressurized. Since the clearance is formed between the top case 2 and the upper surrounding wall as described above, the air 18C can be effectively discharged through the discharge openings and the clearance.

Incidentally, although the discharge openings 16 are formed at the upper and lower surfaces at the front right corner area and the upper surface of the rear left corner area of the chassis, the discharge openings 16 may be formed only at either one of the upper and lower surfaces at the front right corner area when a heat energy generated by the optical disk apparatus is small. In this case, the flow path 5f for the discharge openings 16 at the rear left corner area may be omitted to simplify the structure of the tray 5. Further, when it is made difficult to form the discharge openings on the top case by attaching the label or the like for the discharge openings to be formed on the top case, the discharge openings 16 may be formed concentratedly on a side and/or lower surface of the height portion of the bottom case to obtain a sufficient cooling performance.

Embodiment 2

Figure 4:
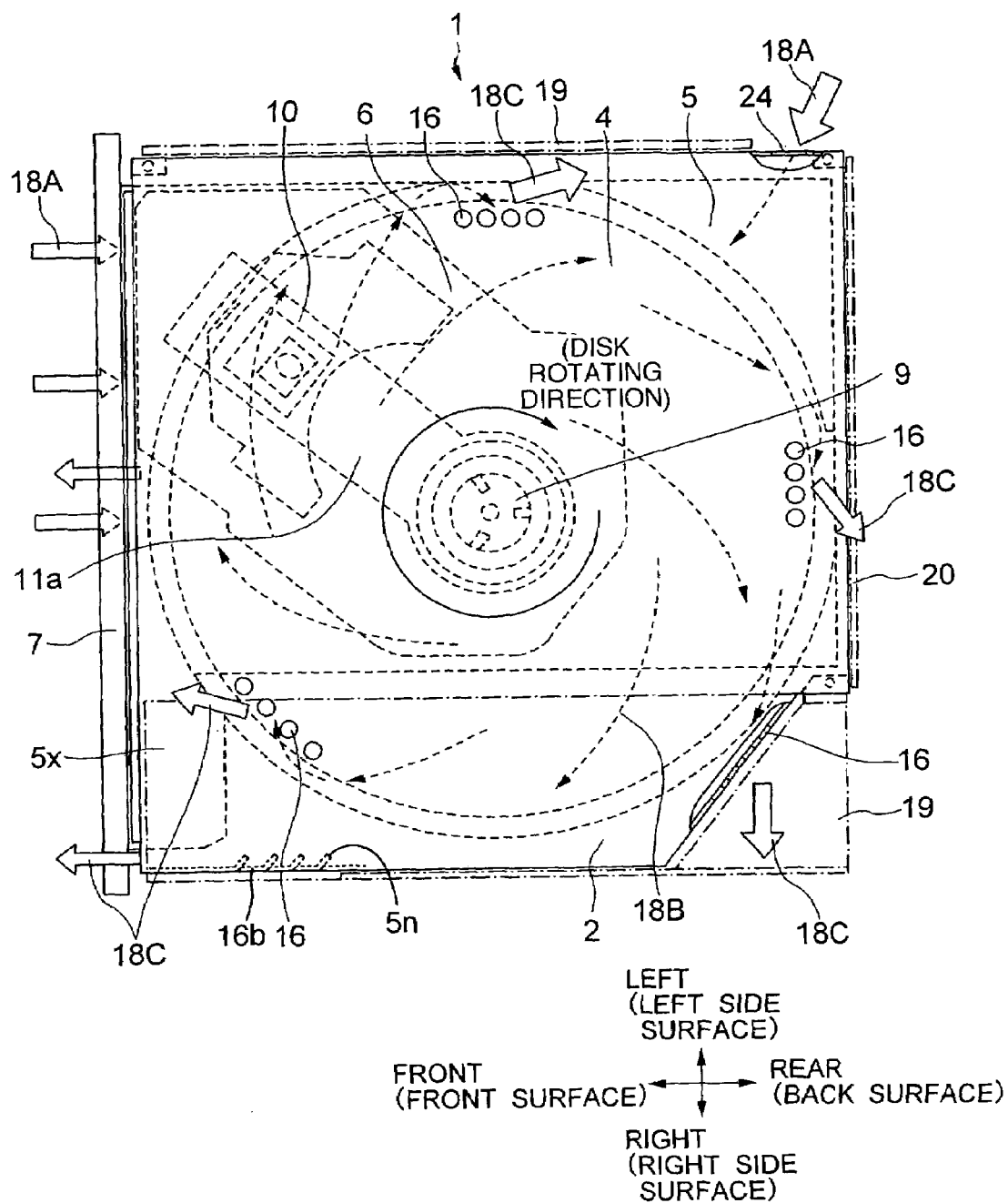
FIG. 4 is a plane view showing another embodiment of optical disk apparatus of the invention.

Another embodiment of optical disk apparatus of the invention is shown in FIG. 4 as a front view thereof. This embodiment is different from the above embodiment in a position of the discharge openings. Concretely, the discharge openings 16 are formed on the upper surface of the top case 2 at a radial inside of the outer periphery of the optical disk 4. That is, the discharge openings are formed on circumferential three positions of the vicinity of the blocking or damming member 5x, the rear end area and the outermost left area. Further, the discharge openings 16 are formed on a side surface of the height portion 3x of the bottom case at both the rear right corner area and the front right corner area. The openings 16 are formed on the side surface have louver parts 5n as below described in embodiment 4.

The discharge openings 16 formed on the upper surface of the top case 2 are arranged at a radial outside from a diameter of 90% of a diameter of the outer periphery of the optical disk 4 and a radial inside from the outer periphery of the optical disk 4. The discharge openings 16 on this region enable the interior air to flow to the discharge openings 16. The discharge openings 16 formed on the side surface are arranged at the radial outside of the disk 4 while being prevented from interfering or contacting with the equipping member 19 for being mounted on the personal computer. The exterior air introduced into the optical disk apparatus 1 is pressurized as the interior air 18B at this region to be discharged out of the optical disk apparatus effectively as the discharge air 18c. Further the discharge air from the side surface do not affect the air discharged from another personal computer element.

Incidentally, an intake opening 24 for taking in the exterior air is formed at a lower area of a rear left side surface. Since the intake opening 24 is arranged at the lower area of the rear left side surface, the vicinity of the intake openings 24 forms an open space prevented from being affected by the step portion of the flow path 5g. Since an interior pressure is low and a space for flowing the exterior air is securely kept inside the intake opening 24, the exterior air 18A can be effectively taken in. Positions of the discharge openings and intake opening are determined to be prevented from interfering or contacting with the mounting member 19 and the interior elements such as guide rails 8 when the side surface of the bottom case is utilized, and is determined to be prevented from interfering or contacting with the connector member 20 when the rear surface of the bottom case is utilized. Incidentally, if the connector member 20 extends substantially over the whole of the rear surface, these openings may be formed on the upper, lower and/or side surface. Also this embodiment, A flow rate of the air taken in from the exterior is effectively increased to decrease temperatures of the interior air and inner parts. Therefore, a heat radiation or cooling performance of the chassis is significantly improved.

Embodiment 3

Figure 5:
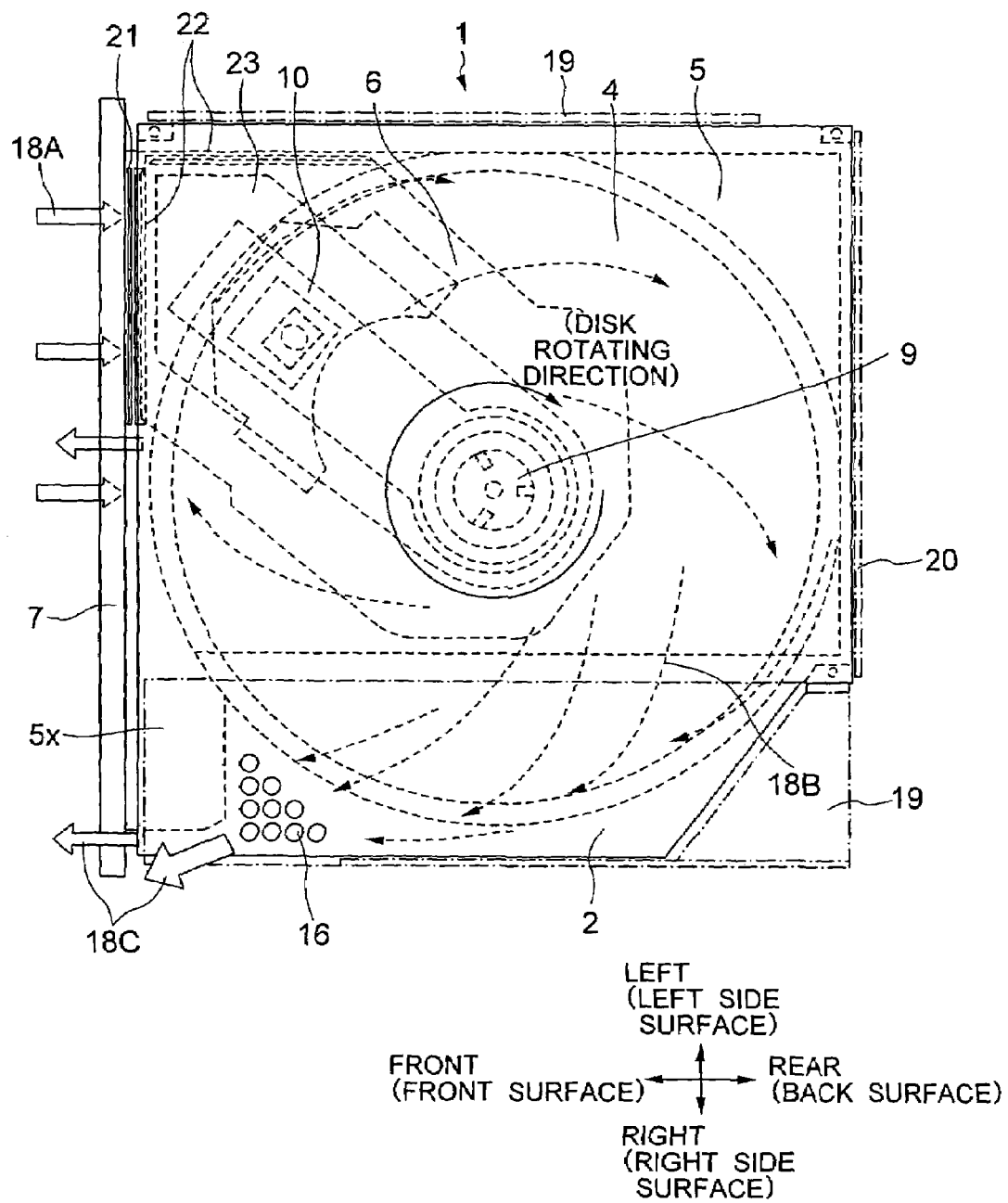
FIG. 5 is a plane view showing another embodiment of optical disk apparatus of the invention.
Figure 6:
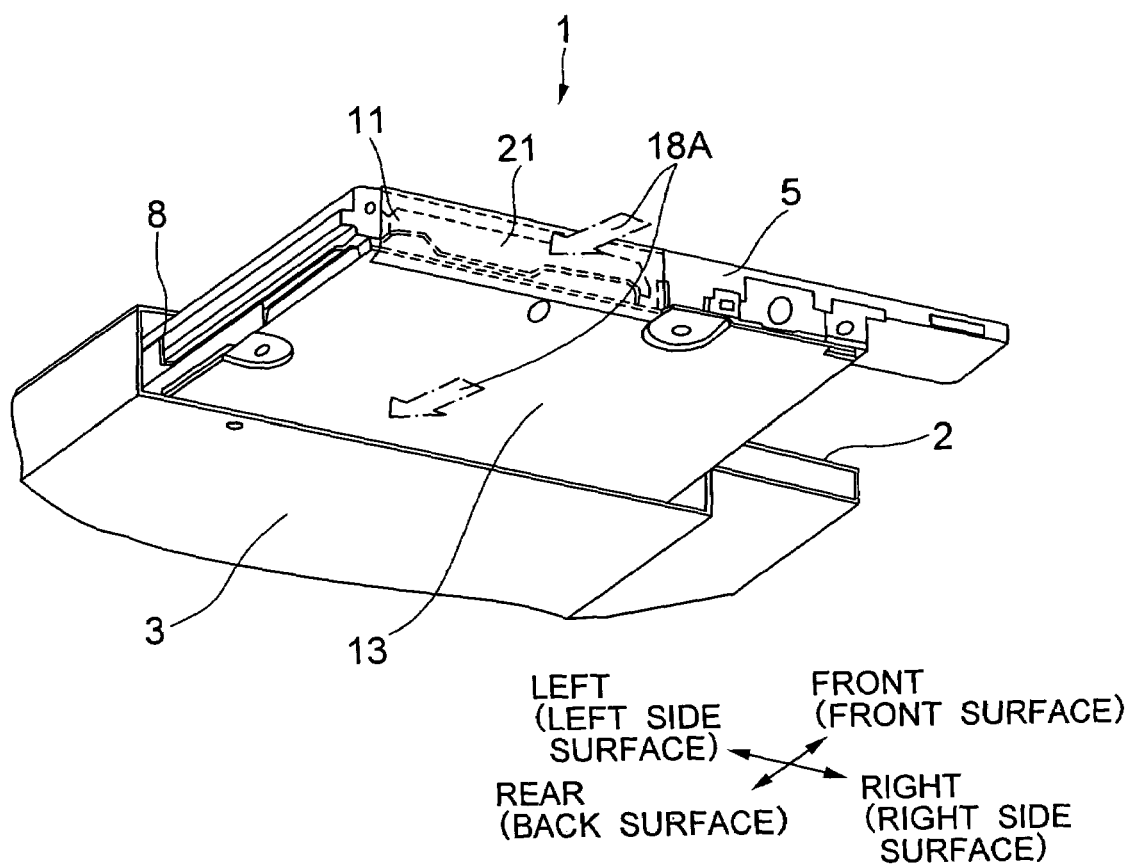
FIG. 6 is an oblique projection view showing the optical disk apparatus shown in FIG. 5.
Figure 7:
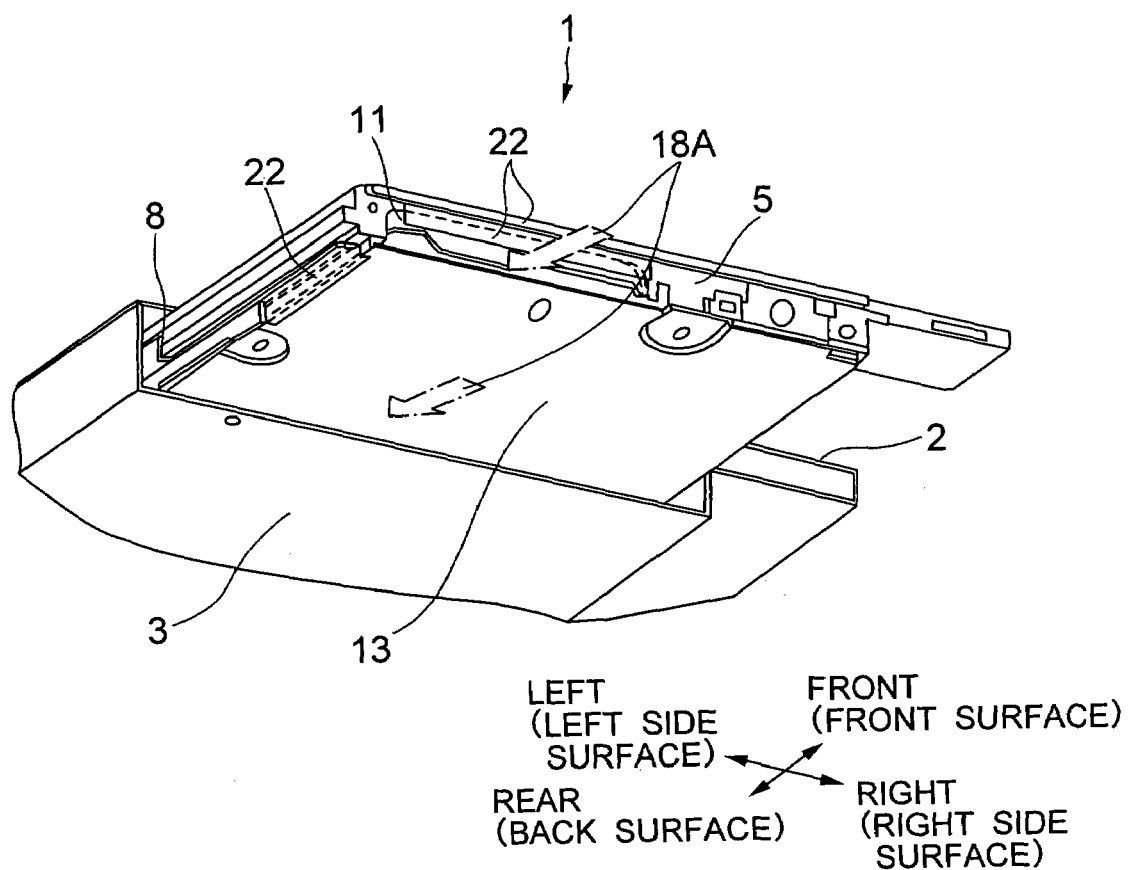
FIG. 7 is an oblique projection view showing the optical disk apparatus shown in FIG. 5.
Figure 8:
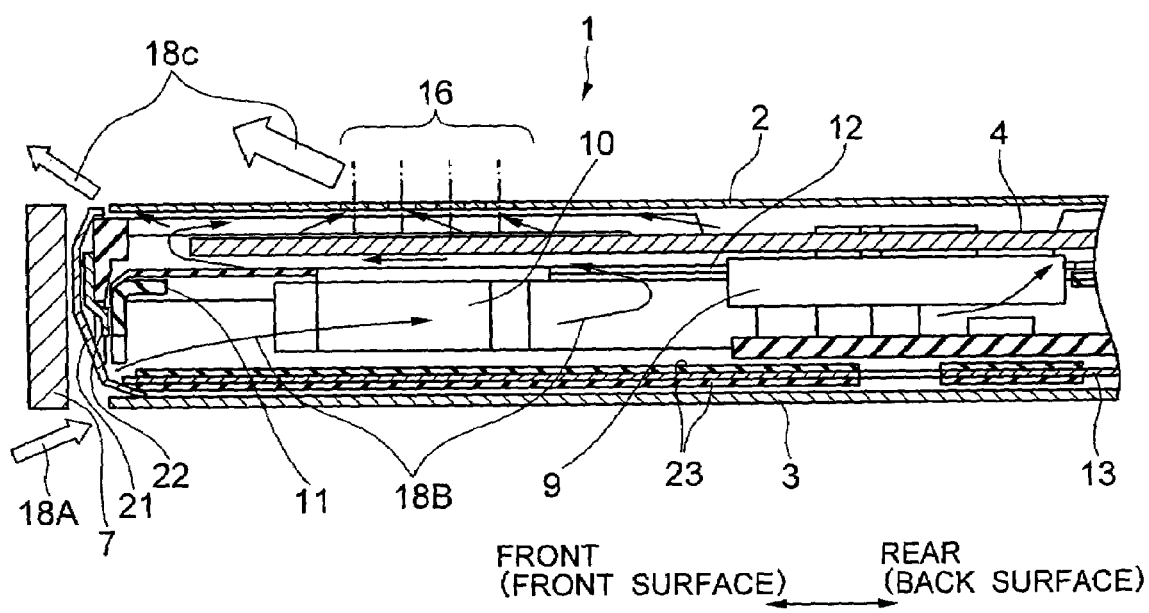
FIG. 8 is a cross sectional view showing a part of the optical disk apparatus shown in FIG. 5.

Another embodiment of optical disk apparatus of the invention is explained with making reference to FIGS. 5-8. FIG. 5 is a front view of the optical disk apparatus, FIG. 6 is an oblique projection view of a front part of the optical disk apparatus, FIG. 7 is an oblique projection view showing the front part of the optical disk apparatus before attaching a filter 21 and a front panel 17 thereto after the tray is drawn out from the chassis, and FIG. 8 is a cross sectional view along F-F in FIG. 5 showing the front part of the optical disk apparatus before attaching the front panel. This embodiment is differentiated from the above embodiment by that in this embodiment has the filter 21 arranged at a rear area over the front panel 7 at the front left region, and a rectifying sealing member 22 arranged at a rear back area and a left side of the filter 21 and a left side area of the filter 21 to seal a clearance with respect to the tray 5 and other parts. Further, a heat radiation coating 23 is arranged at a back surface of an under-cover 3 to enhance a heat radiation from the chassis.

The filter 21 is attached to a front surface of the tray 5 at a left side from a center of the chassis and extends in a height direction to a front side of a lower surface of the under cover 13, so that a clearance between a lower end of the mechanical chassis 11 and a front end of the under cover 13 and a clearance between the under cover 13 and the bottom cover 3 is veiled. The filter is made of a thin, soft and low air-flow-resistance substance such as non woven fabric. As a result of forming the discharge openings, the external air 18a is positively introduced together with dust into the optical disk apparatus, and a provability of contamination of the optical parts is increased. In this embodiment, such provability of contamination is decreased by the filter 21 arranged at a main air-intake area to clean the external air 18A so that the failure of the optical disk apparatus 1 caused by the dust is restrained.

The rectifying sealing member 22 as shown in detail in FIG. 7 is arranged at the right back and the left side of the filter 21. The rectifying sealing members 22 are arranged over the substantially full width of the clearance between the mechanical chassis and the tray 5 at the front upper area of the chassis, and the clearance between the under cover 13 and the lower end of the tray 5 at a front left side surface at the left side of the chassis, so that leakage of the hot interior air 18B and the hot discharge air 18C from the high temperature area along the front surface and front left side surface of the chassis are suppressed. Further, the cold exterior air 18A is introduced without mixing and heating by the leaked interior air 18B and the leaked discharge air 18C.

A heat radiation coating 23 of high heat radiation coefficient or emissivity in comparison with the tray 5 and under cover 13 is arranged on the upper and lower surface areas of the under cover 13 corresponding to the hot spindle motor 9 as high temperature member and a movable range in which the hot optical pickup is movable (refer to FIG. 8). When the introduction of the exterior air is accelerated or increased by forming the discharge openings 16, a heat discharge amount and heat discharge effect (cooling effect inside the optical disk apparatus) of the cooling air is caused mainly by a flow convection phenomenon. The heat radiation coating 23 applied to the under cover 13 further causes or promotes the heat discharge or cooling with an additional heat radiation. The heat discharge amount and heat discharge effect or cooling effect by heat radiation is variable in accordance with or depends on a temperature and emissivity of an object to be cooled.

When the optical disk apparatus is operated at a low rotational speed, the convection flow of the cooling air is so week for the interior temperature rise in some condition. The heat radiation or cooling effect of the heat radiation coating 23 accelerates the heat discharge. Therefore, a combination of the heat radiation coating 23 and the discharge openings 16 realizes high cooling performance of the chassis at wide rotational speed range of the optical disk 5, in comparison with a case of forming only the discharge openings 16.

Incidentally, although both the rectifying sealing member 22 and the heat radiation coating 23 are applied to the embodiment, according to a requirement for decreasing cost and technical specification of the optical disk apparatus 1, these additional two means may be selected. For example, the filter 21 may be eliminated when being used in a clean environment and at a relatively low rotational speed. Further, for structural simplicity, the rectifying sealing member 22 may be eliminated.

Embodiment 4

Figure 9A:
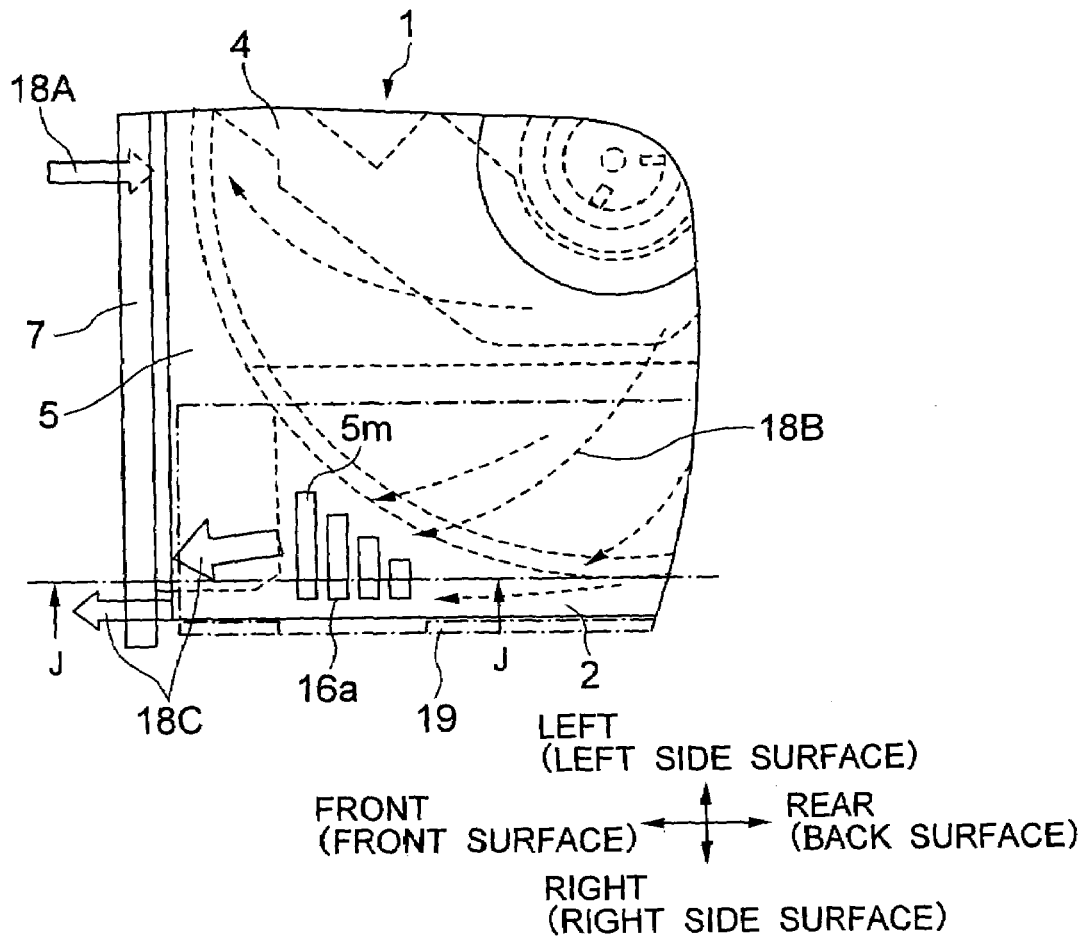
FIGS. 9A-B are a plane view showing a part of another embodiment of optical disk apparatus of the invention and a cross sectional view taken along J-J of FIG. 9A.
Figure 9B:
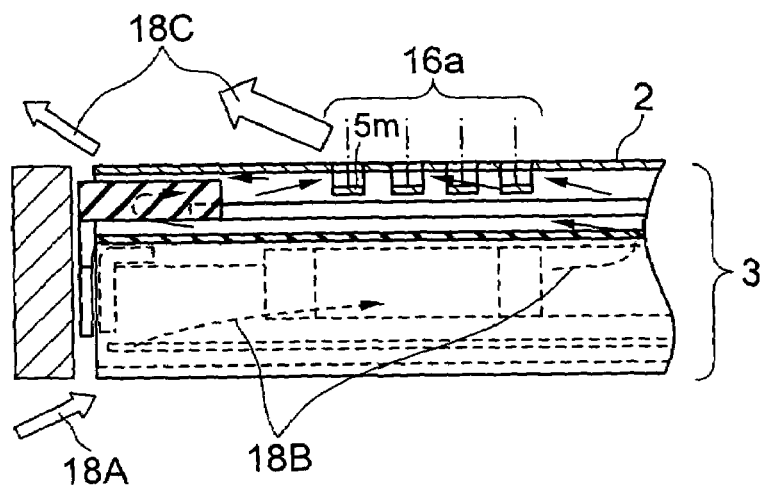
Figure 10A:
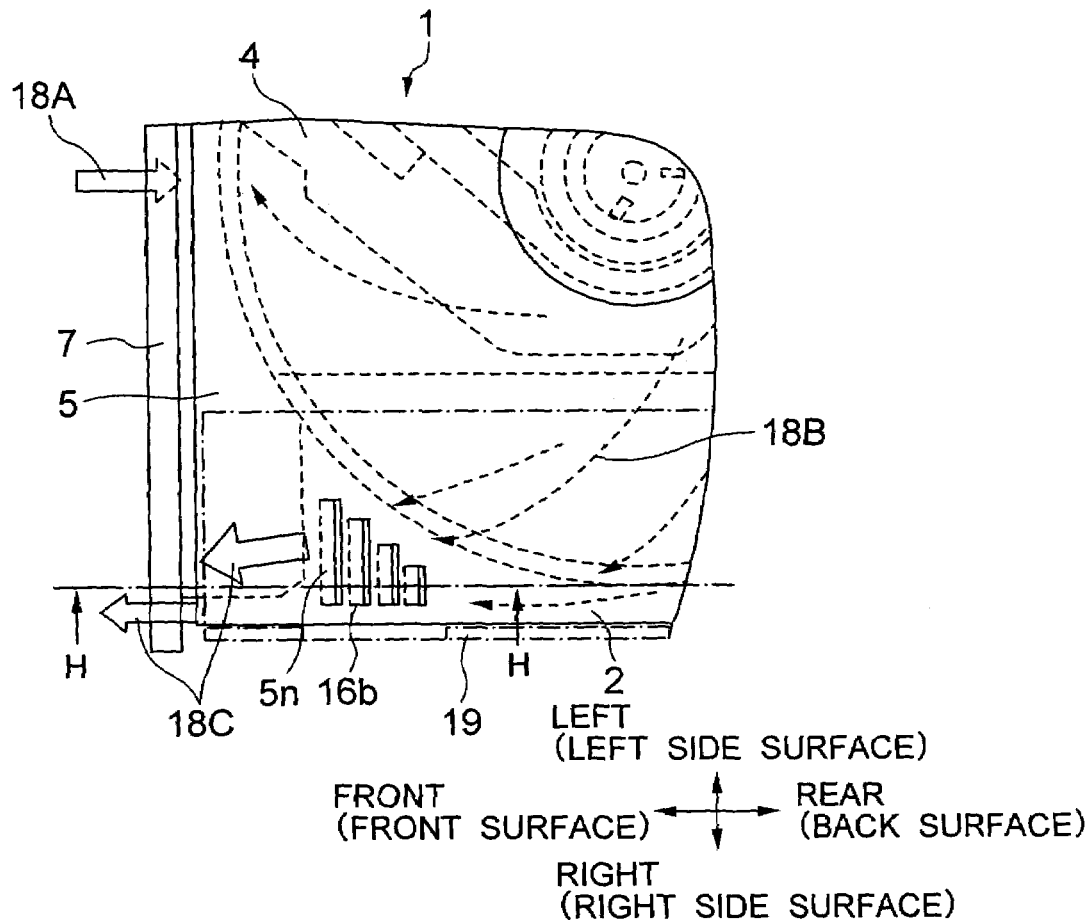
FIGS. 10A-B are a plane view showing a part of another embodiment of optical disk apparatus of the invention and a cross sectional view taken along H-H of FIG. 10A.
Figure 10B:
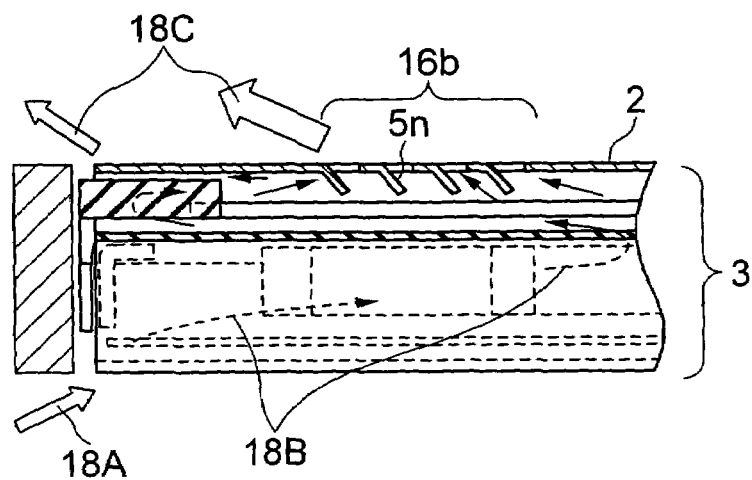

The other embodiments of optical disk apparatus of the invention are explained with making reference to FIGS. 9 and 10. FIGS. 9A and 10A are plane views of a front right part of the optical disk apparatus, and FIGS. 9B and 10B are cross sectional views along J-J and H-H thereof respectively. Although the discharge openings 16 have circular shapes in each of the above-mentioned embodiments, in these embodiments, discharge openings are formed as rectangular depressions.

That is, front right discharge openings 16a and 16b are formed in the front right area by cutting and binding inward strips on the surface into hollow rectangular slits 5m and hollow louvers 5n respectively or pressing inward parts 5m of the top case 2 between slits 5j and 5h, lengths of which slits increase toward the front side, or by pressing inward parts 5n of the top case 2 defined by C-shaped slits 5k to be changed to louvers 5n.

When the discharge openings are formed by the inwardly depressed parts, the parts have depressed heights prevented from interfering the optical disk 4 when being moved, or the depth of these slits 5m and louvers 5n should be limited not to contact the optical disk when being loaded. When the discharge openings are formed by the inwardly depressed louvers, the louvers have depressed heights prevented from interfering the optical disk 4 when being moved. The louvers 5n open backward or extend from downstream side of the openings to effectively guides the intenal air 18b into the openings. Flow resistance through these discharge openings of the slits and louvers can be controlled as the same as those through the above mentioned discharges openings of circular shape, so a flow rate of the taken in from the exterior is increased effectively and the cooling performance of the chassis is significantly improved also in these embodiments. Even when the discharge openings have louver shape or depressed slit shape, a resistance against the discharged air 18C is small similarly to the circular shape to effectively discharge the discharged air 18C. Further, they may be monolithic with the top case 2, and can restrain the dust from being taken in when being stopped.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disk apparatus for writing and/or reading information on a front recording surface of an optical disk, comprising:
   a chassis including a first wall facing to the front recording surface in a thickness direction of the optical disk, and a second wall facing to a reverse surface of the optical disk opposite to the front recording surface in the thickness direction, so that the optical disk is capable of being contained in the chassis, and
   a tray being movable with respect to the chassis in a movable direction perpendicular to the thickness direction and adapted to support the optical disk thereon so that the optical disk is movable with respect to the chassis in the movable direction, wherein the chassis has an opening for discharging air from an inside of the chassis to an outside of the chassis through the opening, and wherein the opening has first and second peripheral edges opposite to each other in a direction of an air flow capable of being generated by a rotation of the optical disk, the first peripheral edge is arranged at a relatively downstream side with respect to the second peripheral edge in the direction of the air flow, and a distance of the first peripheral edge obtainable with respect to the optical disk in the thickness direction is smaller than a distance of the second peripheral edge obtainable with respect to the optical disk in the thickness direction, the opening being arranged at a radial outside with respect to an outer periphery of the optical disk to be prevented from overlapping the optical disk as seen in the thickness direction when the tray is positioned at a disk rotating position at which the optical disk is capable of being rotated for writing and/or reading the information on the optical disk.

2. An optical disk apparatus according to claim 1, wherein the chassis has an aperture through which the tray is movable in the movable direction so that a part of the tray capable of holding thereon at least a part of the optical disk is capable of being taken out through the aperture to an outside of the chassis, the tray is movable to a disk rotating position at which the optical disk is capable of being rotated in a predetermined rotary direction on a rotational axis as seen in the thickness direction for recording the information into the optical disk and/or reading the information from the optical disk, and the opening is arranged on a part of the chassis, which part is defined, when the tray is kept at the disk rotating position so that the optical disk is rotated on the rotational axis in the predetermined rotary direction for recording the information into the optical disk and/or reading the information from the optical disk, as seen in a direction parallel to the thickness direction, by a first imaginary straight line extending from the rotational axis toward the aperture in a direction parallel to the movable direction and a second imaginary straight line extending from the rotational axis in a direction perpendicular to the movable direction, while at a boundary of the part along the second imaginary straight line, a tangential component of a rotational moving direction of the optical disk proceeds toward the aperture as seen in the direction parallel to the thickness direction.

3. An optical disk apparatus according to claim 1, wherein the opening is arranged on the chassis in such a manner that as seen in a direction parallel to the thickness direction, the opening is capable of overlapping a region in the chassis, at which region a maximum pressure of the air in the chassis is generated when the tray is kept at a disk rotating position at which the optical disk is capable of being rotated for writing and/or reading the information on the optical disk.

4. An optical disk apparatus according to claim 1, wherein the chassis has an aperture through which the tray is movable in the movable direction so that a part of the tray capable of holding thereon at least a part of the optical disk is capable of being taken out through the aperture to an outside of the chassis, the tray is movable to a disk rotating position at which the optical disk is capable of being rotated in a predetermined rotary direction on a rotational axis as seen in the thickness direction for recording the information into the optical disk and/or reading the information from the optical disk, and the opening is arranged on a part of the chassis, which part is defined, when the tray is kept at the disk rotating position so that the optical disk is rotated on the rotational axis in the predetermined rotary direction for recording the information into the optical disk and/or reading the information from the optical disk, as seen in a direction parallel to the thickness direction, by a first imaginary straight line extending from the rotational axis in a direction away from the aperture and parallel to the movable direction and a second imaginary straight line extending from the rotational axis in a direction perpendicular to the movable direction, while at a boundary of the part along the second imaginary straight line, a tangential component of a moving direction of the optical disk proceeds away from the aperture as seen in the thickness direction.

5. An optical disk apparatus according to claim 1, wherein the chassis has an air intake opening extending between the tray and the first wall in the thickness direction.

6. An optical disk apparatus according to claim 1, wherein the tray has a filter contactable with the first wall to cover a clearance capable of being formed between the tray and the first wall when the tray is positioned at a disk rotating position at which the optical disk is capable of being rotated for writing and/or reading the information on the optical disk.

7. An optical disk apparatus according to claim 6, wherein the tray has a sealing member for controlling a radially outward air flow created by a rotation of the optical disk so that the radially outward air flow being avoided mixing with the filtered air taken in from the exterior of the optical disk apparatus.

8. An optical disk apparatus according to claim 1, wherein the tray includes a mechanical unit having a spindle motor for rotating the optical disk and an optical pickup movable with respect to the spindle motor to write and/or read the information on the optical disk, and a heat radiation coating applied onto an under surface of the mechanical unit, particularly, the area overlapping at least one of the spindle motor and a movable range in which the optical pickup is movable as seen in the thickness direction, and the emissivity of the heat radiation coating is greater than that of the mechanical unit.

9. The optical disk apparatus of claim 1, wherein a partition is formed in the first wall of the chassis and disposed in relation to the opening such that an air flow produced by rotation of the optical disk is guided by the partition for discharge from the chassis through the opening.

10. An optical disk apparatus for writing and/or reading information on a front recording surface of an optical disk, comprising:

a chassis including a first wall facing to the front recording surface in a thickness direction of the optical disk, and a second wall facing to a reverse surface of the optical disk opposite to the front recording surface in the thickness direction, so that the optical disk is capable of being contained in the chassis, and a tray being movable with respect to the chassis in a movable direction perpendicular to the thickness direction and adapted to support the optical disk thereon so that the optical disk is movable with respect to the chassis in the movable direction, wherein the chassis has an opening for discharging air from an inside of the chassis to an outside of the chassis through the opening, wherein the opening has first and second peripheral edges opposite to each other in a direction of an air flow capable of being generated by a rotation of the optical disk on a rotational axis, the first peripheral edge is arranged at a relatively downstream side with respect to the second peripheral edge in the direction of the air flow, and as seen in a direction parallel to the thickness direction, a distance of the first peripheral edge obtainable with respect to the rotational axis in a direction perpendicular to a movable direction in which the tray is movable with respect to the chassis is smaller than a distance of the second peripheral edge obtainable with respect to the rotational axis in the direction perpendicular to the movable direction, the opening being arranged at a radial outside with respect to an outer periphery of the optical disk to be prevented from overlapping the optical disk as seen in the thickness direction when the tray is positioned at a disk rotating position at which the optical disk is capable of being rotated for writing and/or reading the information on the optical disk.

11. The optical disk apparatus of claim 10, wherein a partition is formed in the first wall of the chassis and disposed in relation to the opening such that an air flow produced by rotation of the optical disk is guided by the partition for discharge from the chassis through the opening.

12. An optical disk apparatus for writing and/or reading information on a front recording surface of an optical disk, comprising:

a chassis including a first wall facing to the front recording surface in a thickness direction of the optical disk, and a second wall facing to a reverse surface of the optical disk opposite to the front recording surface in the thickness direction, so that the optical disk is capable of being contained in the chassis, and a tray being movable with respect to the chassis in a movable direction perpendicular to the thickness direction and adapted to support the optical disk thereon so that the optical disk is movable with respect to the chassis in the movable direction, wherein the chassis has an opening for discharging air from an inside of the chassis to an outside of the chassis through the opening, and wherein at least one of the first and second walls has an extension part overlapping at least partially the opening as seen in a direction parallel to the thickness direction and capable of being arranged between the opening and the optical disk in the thickness direction, the opening being arranged at a radial outside with respect to an outer periphery of the optical disk to be prevented from overlapping the optical disk as seen in the thickness direction when the tray is positioned at a disk rotating position at which the optical disk is capable of being rotated for writing and/or reading the information on the optical disk.

13. The optical disk apparatus of claim 12, wherein a partition is formed in the first wall of the chassis and disposed in relation to the opening such that an air flow produced by rotation of the optical disk is guided by the partition for discharge from the chassis through the opening.

* * * * *